(12) United States Patent
Morimitsu

(10) Patent No.: US 8,947,508 B2
(45) Date of Patent: Feb. 3, 2015

(54) IMAGE PROCESSING APPARATUS

(75) Inventor: Noboru Morimitsu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/307,258

(22) Filed: Nov. 30, 2011

(65) Prior Publication Data

US 2012/0133739 A1    May 31, 2012

(30) Foreign Application Priority Data

Nov. 30, 2010    (JP) .................................. 2010-266952

(51) Int. Cl.
*G08B 17/12* (2006.01)
*G01C 11/06* (2006.01)
*G01B 11/24* (2006.01)
*G06K 9/00* (2006.01)

(52) U.S. Cl.
CPC ................ *G01C 11/06* (2013.01); *G01B 11/24* (2013.01); *G06K 9/00771* (2013.01); *G08B 17/125* (2013.01)
USPC .............. 348/46; 340/578; 348/169; 382/100

(58) Field of Classification Search
CPC ....................................................... G01B 11/24
USPC .......................................................... 348/46
See application file for complete search history.

(56) References Cited

U.S. PATENT DOCUMENTS

| | | | | |
|---|---|---|---|---|
| 5,592,151 A * | 1/1997 | Rolih | ............................. | 340/584 |
| 5,625,342 A * | 4/1997 | Hall et al. | ..................... | 340/578 |
| 5,798,701 A * | 8/1998 | Bernal et al. | .................. | 340/628 |
| 5,937,077 A * | 8/1999 | Chan et al. | ..................... | 382/100 |
| 6,184,792 B1 * | 2/2001 | Privalov et al. | ............... | 340/578 |
| 6,680,671 B2 * | 1/2004 | Okamoto et al. | ............. | 340/578 |
| 6,937,743 B2 * | 8/2005 | Rizzotti et al. | ................ | 382/100 |
| 7,154,400 B2 * | 12/2006 | Owrutsky et al. | ............. | 340/578 |
| 7,164,117 B2 * | 1/2007 | Breed et al. | ................... | 250/221 |
| 7,321,386 B2 * | 1/2008 | Mittal et al. | ................... | 348/169 |
| 7,746,236 B2 * | 6/2010 | Cole | ............................. | 340/577 |
| 7,786,877 B2 * | 8/2010 | Hou | .............................. | 340/578 |
| 8,340,349 B2 * | 12/2012 | Salgian et al. | ................ | 382/103 |

FOREIGN PATENT DOCUMENTS

JP          2004-30225 A       1/2004

* cited by examiner

*Primary Examiner* — William C Vaughn, Jr.
*Assistant Examiner* — Luis M Perez
(74) *Attorney, Agent, or Firm* — McDermott Will & Emery LLP

(57) ABSTRACT

An image processing apparatus which employs a basic configuration including an image processing controller which processes images captured by a stereo camera and a recognition processing controller which recognizes an object based on information from the image processing controller includes a target object area specifying unit, feature amount extracting unit and smoke determining unit as functions of enabling recognition of a smoky object. The target object specifying unit specifies an area of an object which is a detection target, by canceling the influence of the background, the feature amount extracting unit extracts an image feature amount for recognizing a smoky object in a target object area and the smoke deciding unit decides whether the object in the target object area is a smoky object or an object other than the smoky object, based on the extracted image feature amount.

2 Claims, 6 Drawing Sheets

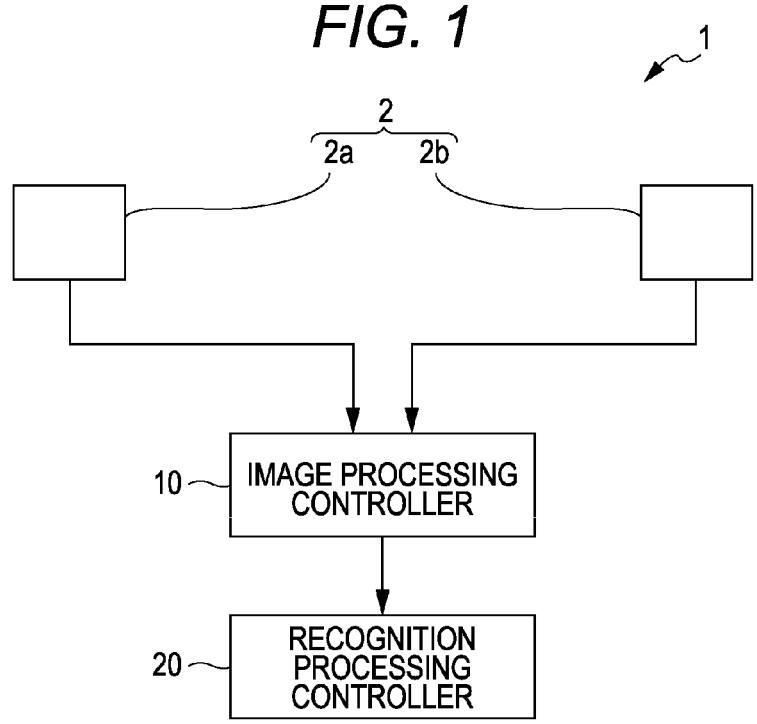
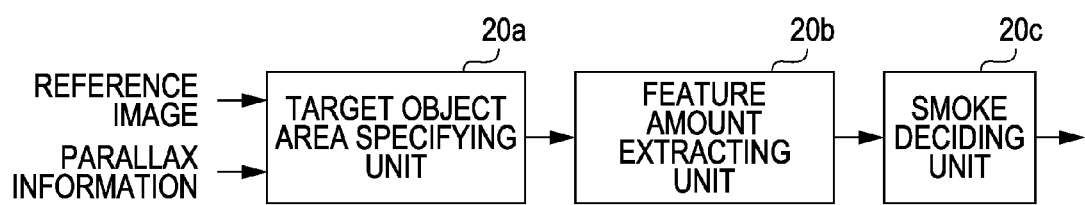

IMAGE PROCESSING APPARATUS

CROSS-REFERENCE TO RELATED APPLICATIONS

The present application claims priority from Japanese Patent Application No. 2010-266952 filed on Nov. 30, 2010, the entire contents of which are hereby incorporated by reference.

BACKGROUND OF THE INVENTION

1. Field of the Invention

The present invention relates to an image processing apparatus that processes an image captured by a stereo camera and detects an object.

2. Description of Related Art

Generally, in the detection of an object by image recognition, it is not easy to detect a smoky object such as steam or smoke at a fire that has little change in brightness and light texture. Hence, various techniques of recognizing a smoky object reflected on an image have been proposed.

For example, Japanese Patent Application Laid-Open No. 2004-30225 discloses a technique of recognizing white smoke by dissolving a color image into R, G and B components, obtaining hue images from color component images and obtaining an intersection of the color component images and hue images. Further, with the technique disclosed in Japanese Patent Application Laid-Open No 2004-30225, detection accuracy is improved by extracting a difference between a current image and an image captured Δt time ahead. of the current image to distinguish an object such as cloud having a same degree of brightness as white smoke.

However, the technique disclosed in Japanese Patent Application Laid-Open No. 2004-30225 is not applicable to monochrome images, and may be influenced by environment. Further, when a camera is mounted on a moving body such as a vehicle and an indoor mobile robot, the camera itself moves, and therefore is influenced by a background, whereby it has difficulty in precisely detecting smoke.

In view of foregoing, it is therefore an object of the present invention to provide an image processing apparatus that can precisely detect a smoky object by eliminating an influence of a background.

SUMMARY OF THE INVENTION

In order to accomplish the above object, an aspect of the present invention provides an image processing apparatus that processes an image captured by a stereo camera and detects an object, the image processing apparatus including: a target object area specifying unit that uses distance data obtained by performing matching processing of the image captured by the stereo camera and specifies an image area in which an object is to be detected as a target object area encircling an object at a same distance; a feature amount extracting unit that performs spatial filter processing of the target object area and extracts an image feature amount; and a smoke determining unit that decides whether or not an object in the target object area is a smoky object, based on the image feature amount in the target object area.

BRIEF DESCRIPTION OF THE DRAWINGS

FIG. 1 is a basic configuration diagram of an image processing apparatus;

FIG. 2 is a functional block diagram for detecting white smoke;

DETAILED DESCRIPTION OF THE PREFERRED EMBODIMENT

Figure 3:
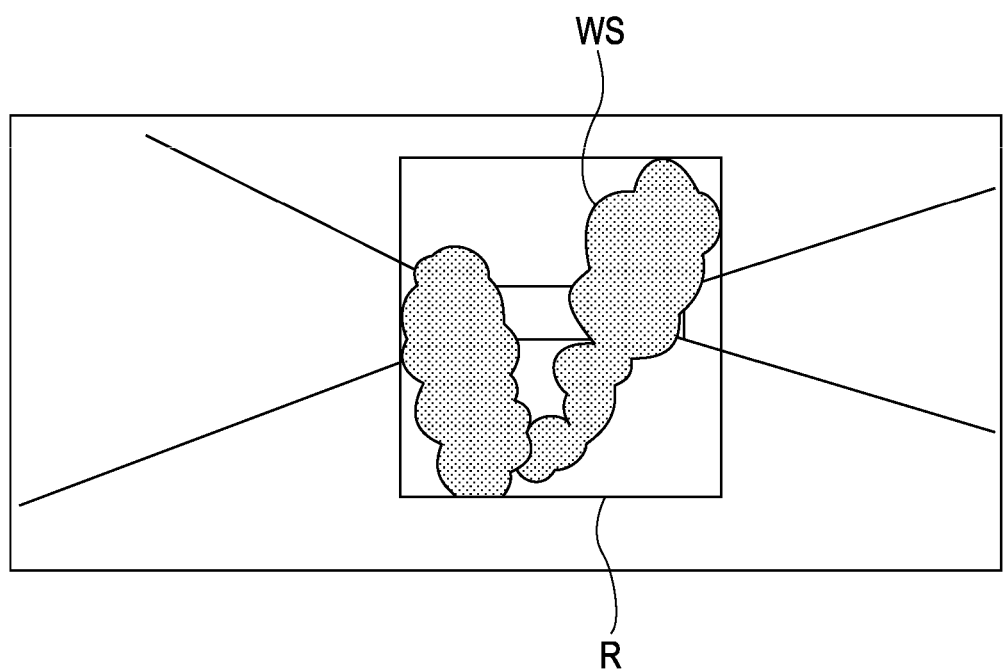
FIG. 3 is an explanatory view of a target object area.

An embodiment of the present invention will be described with reference to the drawings.

An image processing apparatus 1 illustrated in FIG. 1 is mounted on a moving body such as a vehicle or an indoor mobile robot. The image processing apparatus 1 recognizes an object by three-dimensional image recognition, and transmits a recognition result to an unillustrated control apparatus to execute various controls. The basic configuration of this image processing apparatus 1 includes a stereo camera 2 including a plurality of cameras, an image processing controller 10 that processes images captured by the stereo camera 2, and a recognition processing controller 20 that recognizes an object based on information from the image processing controller 10.

In the present embodiment, the stereo camera 2 includes two cameras 2a and 2b having solid-state imaging elements such as CCDs and CMOSs The cameras 2a and 2b are horizontally arranged to achieve parallel stereo alignment in which the camera 2a is used as a reference camera, and the camera 2b is used as a comparison camera. That is, the cameras 2a and 2b are horizontally arranged such that the optical axes thereof are parallel to each other with a predetermined base length (optical axis interval) therebetween, and such that a horizontal scanning direction matches with an epipolar line.

A pair of stereo images captured by the stereo camera 2 are input and processed in the image processing controller 10 to calculate three-dimensional distance information. The image processing controller 10 searches for corresponding positions of an identical object reflected in a reference image captured by the reference camera 2a and a comparison image captured by the comparison camera 2b to calculate a shift amount of the corresponding positions between the images as a disparity.

The corresponding positions between the reference image and the comparison image are determined by evaluating a correlation between the images using, for example, a known area search method. Specifically, a small area (block of 8×8 pixels for example) is set around a certain point in the reference image, and a small area of the same size is provided around a certain point in the comparison image. The correlation between the blocks is computed by shifting the blocks on the comparison image to search for the corresponding position. Using a sum of an absolute difference (SAD) of a pixel value (generally, a brightness value of each pixel) between a block on the reference image and a block on a comparison image for an evaluation function in this correlation computation, a pixel shift amount in the horizontal direction between the blocks which provide a minimum SAD value is used as a disparity between the blocks.

The image processing controller 10 also has a function of controlling a shutter speed of each of the cameras 2a and 2b, correcting a geometric and optical position shifts between the cameras and correcting a brightness balance between images.

The recognition processing controller 20 converts values of the images in a two-dimensional coordinate system into values in a three-dimensional coordinate system in a real space based on position information in the images and disparity information detected by the image processing controller 10. Further, the recognition processing controller 20 performs object recognition by determining data at a position above a street surface or a floor surface based on parameters such as attachment positions and angles of the cameras as data of a three-dimensional object and extracting the data.

Targets of object recognition by this recognition processing controller 20 are not only a solid or liquid object, but also a mass of particles (smoky object) floating in the space. Hence, as illustrated in FIG. 2, the recognition processing controller 20 has a target object area specifying unit 20a, a feature amount extracting unit 20b and a smoke determining unit 20c as functions for enabling the recognition of a smoky object.

In brief, the target object area specifying unit 20a specifies an area of an object that is a detection target by eliminating the influence of the background. The feature amount extracting unit 20b extracts an image feature amount for recognizing a smoky object in a target object area. The smoke determining unit 20c determines whether the object in the target object area is a smoky object or an object of another kind, based on the extracted image feature amount.

Specifically, a target object area is specified as follows. Firstly, as preprocessing, data of small areas at positions above a street surface or a floor surface are subjected to grouping in which small areas having three-dimensional distances within a predetermined threshold are determined to be an identical object (grouping processing). When grouping processing of all small areas is finished, one group is regarded as one object, and an average value of distances of all small areas belonging to the group is regarded as a distance of the object.

Further, a group that is regarded as the identical object is encircled with a minimum value and maximum value in an image coordinate (horizontal and vertical directions) and is specified as a target object area in which the detection target object is reflected. FIG. 3 illustrates an example of the target object area in which a detection target object is white smoke, and a data group (white smoke) WS in a grouped image is encircled in a rectangular shape at ends in the horizontal direction and vertical, direction, and the encircled area R is specified as the target object area. In the present embodiment, the target object area is set in the reference image.

When the target object area is specified, the image feature amount of the target object area is extracted. Then, based on the extracted image feature amount, it is determined whether the object reflected in the area is smoke or an object of another kind. Hereinafter, a case will be described as an example where white smoke is a detection target that is a smoky object.

White smoke has features described below, and, by taking these features into account, it is possible to determine whether or not the object in the target object area is white smoke.

These features can be extracted by applying a spatial filter to the target object area, and white smoke is determines using the extracted image feature amount.

The transmittance or contrast decreases.

The brightness value converges to a certain value.

The range of a brightness distribution narrows and dispersion of brightness becomes small.

The average value of brightness changes from a normal state where there is no smoke.

The sum amount of edges in an area decreases.

An integral filter such as a sober filter or a Laplacian filter for extracting edges, and a statistical filter for extracting values such as a maximum value, a minimum value, an average value, a dispersion and a mode value are used as spatial filters to be applied to the target object area. The feature amount such as a brightness mode value and an average value of the edge strength in an area extracted using these spatial filters can be classified into either one of an attribute of white smoke and an attribute of an object other than white smoke by performing clustering or threshold decision in a feature space, whereby it is possible to precisely detect white smoke.

Further, white smoke detected as an object is smoke that has a high temperature and rises upward, and therefore is likely to extend vertically. Consequently, it is possible to eliminate the influence of the background by clipping an area (target object area) encircling white smoke using distance data acquired from images of the stereo camera 2 with the two cameras 2a and 2b horizontally arranged, and extracting the feature amount belonging to white smoke in the area. As a result, white smoke can be precisely detected.

White smoke and an object that is not white smoke can be classified by dividing the feature space using a known learning machine such as a support vector machine (SVM) or by dividing the feature space using a threshold. The former division method might increase a processing time depending on the capacity of the recognition processing controller 20, while the latter division method can perform high-speed processing with a comparatively simple process. In the present embodiment, an example will be described where a histogram is created from the absolute value or average value of the edge strength of the target object area, and white smoke and an object that is not white smoke are classified based on the histogram using a threshold.

According to classification based on threshold decision, a spatial integral filter using a mask of 3×3 is applied to each pixel of the target object area to obtain a filter image that extracts the edges of the images, as illustrated in FIGS. 4A to 5B. When the spatial integral filter is applied to the image of an object A other than white smoke illustrated in FIG. 4A, a filter image (edge image) A' illustrated in FIG. 4B is obtained. When the spatial integral filter is applied to an image of white smoke B illustrated in FIG. 5 (b), a filter image B' illustrated in FIG. 5 (b) is obtained. The filter image B' of white smoke B illustrated in FIG. 5 (b) has an edge is that lighter than that of the filter image A of the normal object A illustrated in FIG. 4 (b), A broken line in FIG. 5 (b) represents that the edge is light.

When the filter image is obtained, the histogram of the absolute value or average value of the edge strength (the degree of the brightness gradient) of the image is created. In order to avoid the influence of noise of the image, the histogram is created only for pixels having edge strength equal to or larger than a predetermined value (for example, pixels having the edge strength ≤3 are considered as a noise and excluded) Further, when edge strength EN whose cumulative frequency accumulating frequencies from an upper class is equal to or more than N% of the total is equal to or smaller than a threshold S, the object in the target object area is determined to be white smoke.

Figure 4A:
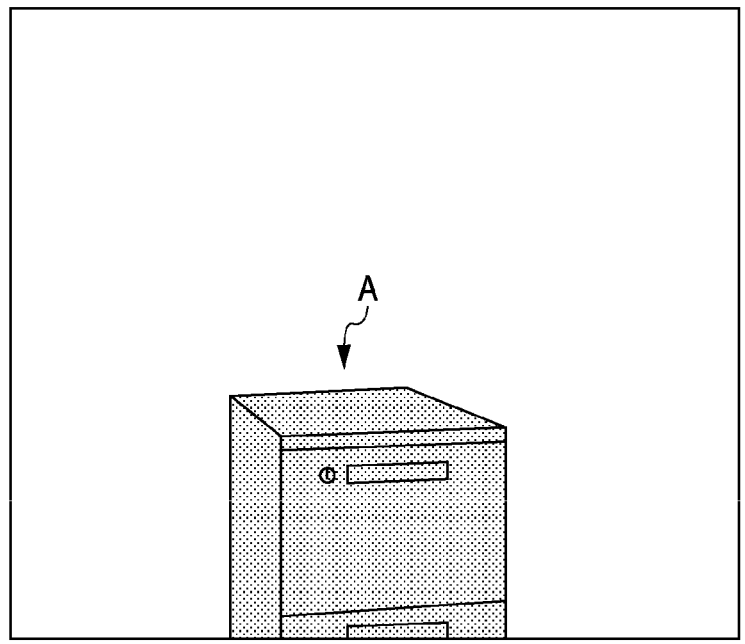
FIG. 4A is an explanatory view illustrating an image of an object other than smoke.
Figure 4B:
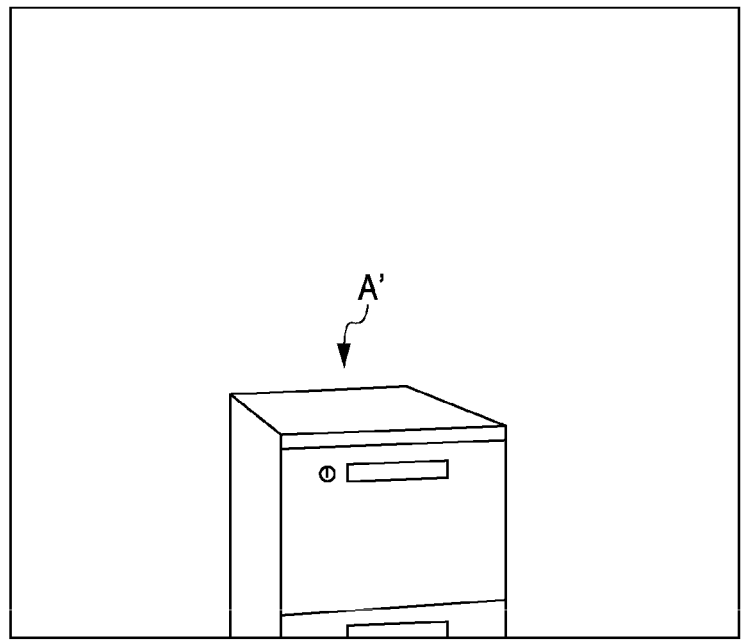
FIG. 4B is an explanatory view illustrating a filter image thereof.
Figure 5A:
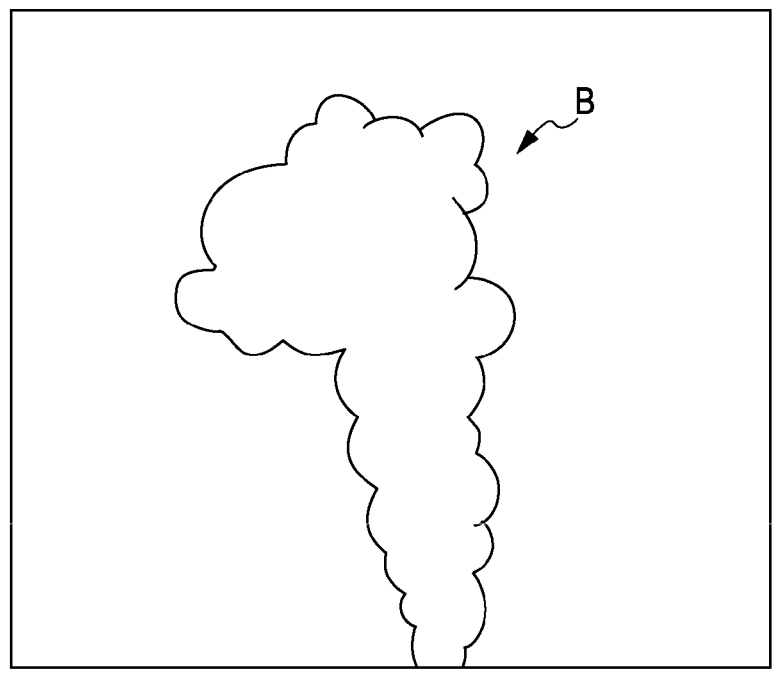
FIG. 5A is an explanatory view illustrating an image of smoke.
Figure 5B:
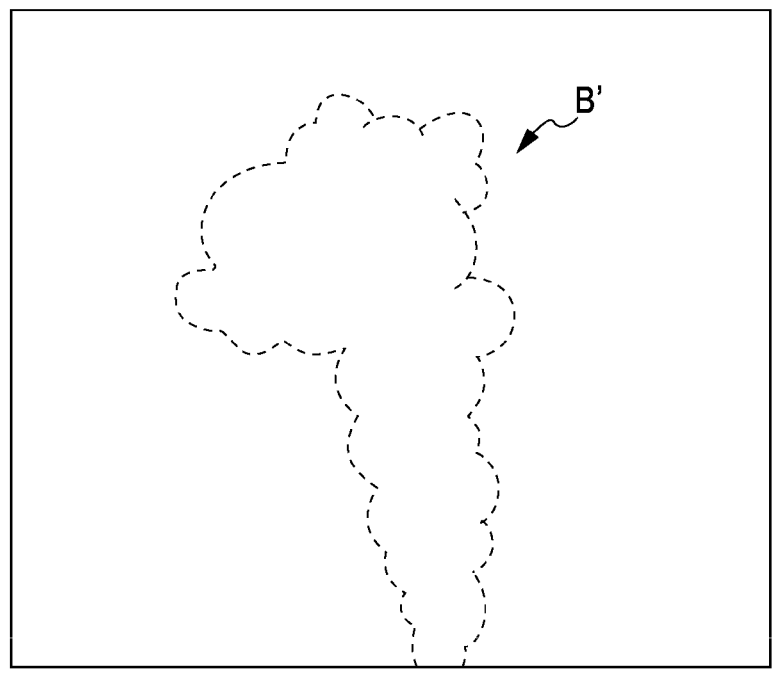
FIG. 5B is an explanatory view illustrating a filter image thereof.
Figure 6A:
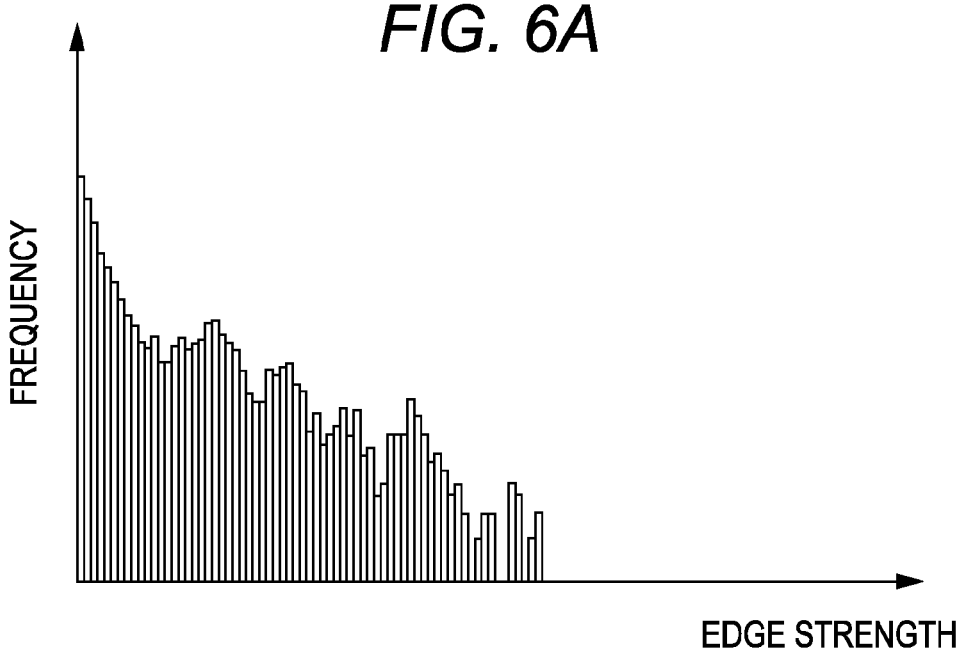
FIG. 6A illustrates a histogram of edge strength of an object other than smoke and, and FIG. 6B illustrates a cumulative frequency thereof.

For example, when a. histogram of the edge strength is created from the filter image of the object A other than white smoke in FIG. 4B, a histogram illustrated in FIG. 6A is obtained. When a histogram of the edge strength is created from the filter image of white smoke B in FIG. 5B, a histogram illustrated in FIG. 7A is obtained. Further, when the relationship between edge strength and the cumulative frequency in which frequencies are added sequentially from an upper class is calculated for each of the histograms, relationships illustrated in FIGS. 6B and 7B are obtained.

Figure 6B:
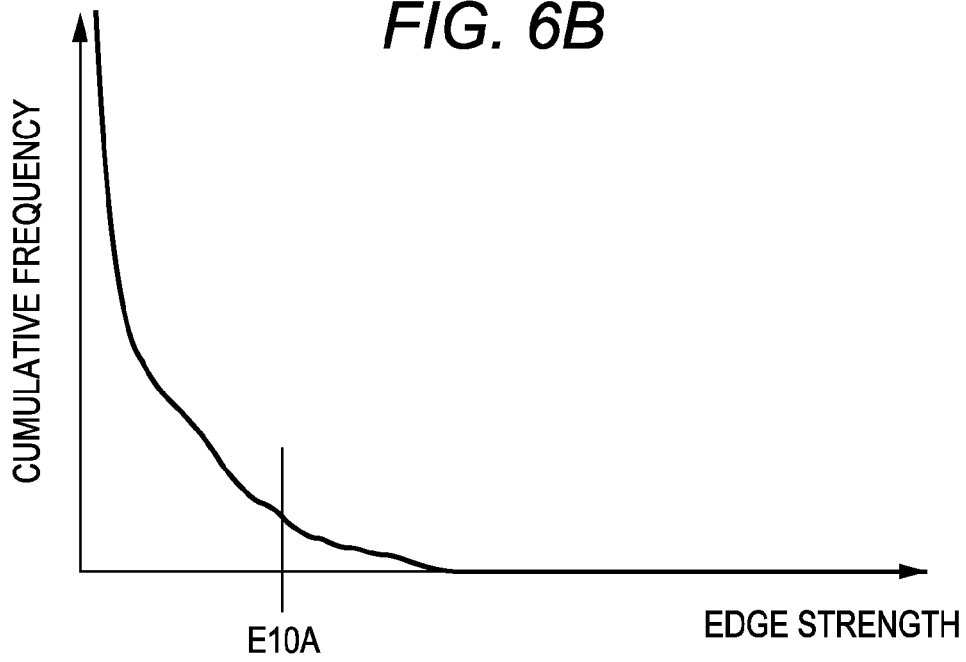
Figure 7A:
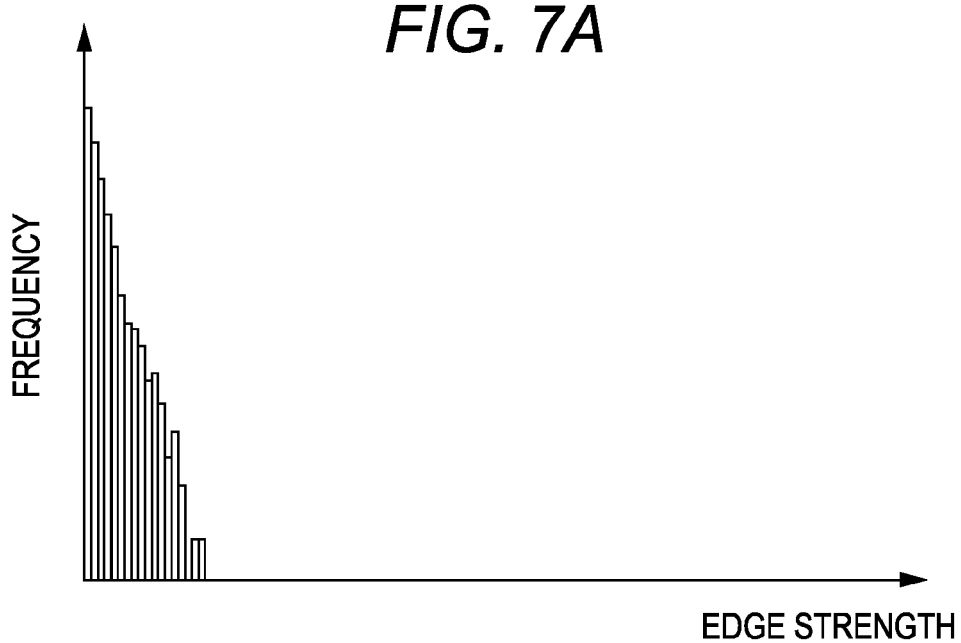
FIG. 7A illustrates a histogram of the edge strength of an image of smoke.
Figure 7B:
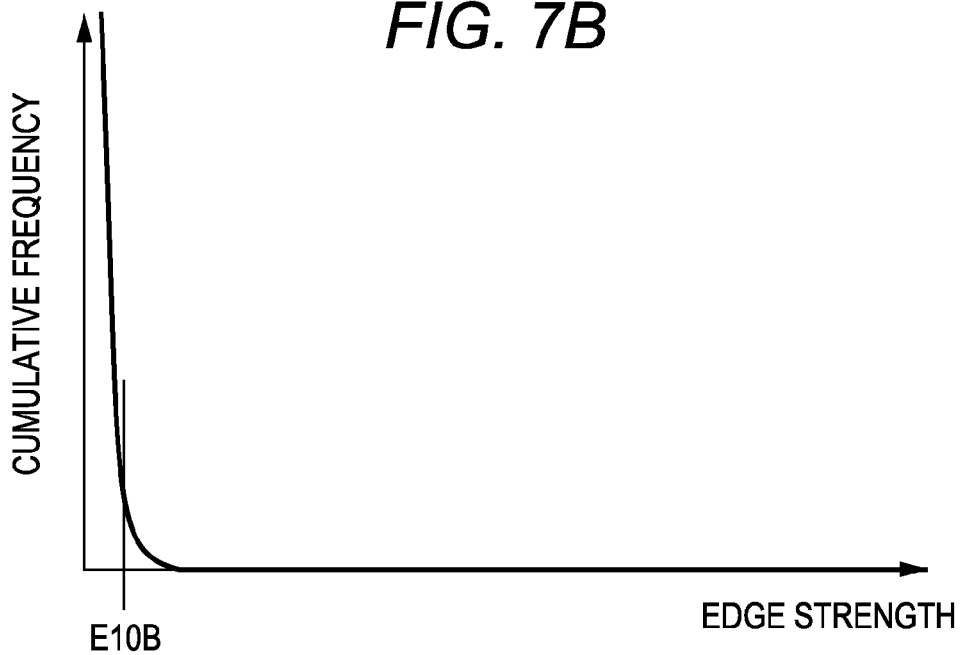
FIG. 7B illustrates a cumulative frequency thereof.

For example, edge strength having the cumulative frequency equal to or more than 10% of the total is calculated in FIGS. 6B and 7B. Edge strength E10A in FIG. 6B where the cumulative frequency is 10% or more in the case of the object A other than white smoke illustrated is obviously greater than edge strength E10B illustrated in FIG. 7B where the cumulative frequency is 10% or more in the case of white smoke B. Consequently, it is possible to determine whether or not an object is white smoke by setting the threshold S to an appropriate value such that E10A>S>E10B.

In this case, a plurality of thresholds of edge strength instead of one threshold may be set and stored in a table according to brightness of an image. Specifically, by calculating an average value of a brightness value of all pixels in a target object area and setting a plurality of thresholds of edge strength according to average brightness, it is possible to deal with the change of illumination environment.

Thus, with the present embodiment, when a smoky object is detected by image recognition using a stereo camera, a detection area is specified targeting at an object at the same distance, so that it is possible to extract spatial features from which background information is excluded and decide whether or not an object is a smoky object. Moreover, a temporal change of an image needs not to be followed, so that it is possible to perform precise decision even when a camera is mounted on a moving body and moves.

Meanwhile, a decision result may be stabilized using a spatial filter and temporal filter in combination. When, for example, smoke is decided to be 1 and an object other than smoke is decided to be 0, if a lowpass filter is applied and, for example, the decision result is greater than 0.5, the object may be decided to be smoke.

What is claimed is:

1. An image processing apparatus that processes comprising:
    a stereo camera including a reference camera to capture a reference image and a comparison camera to capture a comparison image;
    an image processing controller configured to
        obtain disparity information of each point commonly found in the reference image and
        the comparison image for calculating three-dimensional distance information to be used to specify an object captured by the stereo camera;
    a recognition processing controller configured to:
        specify a target object area encircling the object in one of the reference image and
        the comparison image based on the three-dimensional distance information,
        the object including a plurality of objects located within a predetermined distance;
    perform spatial filter processing of the target object area to extract
        an image feature amount including at least one of a brightness mode value which is cumulative frequencies of edge strength of the object in the target area, and
        an average value of the edge strength of the object in the target area: and
    determine whether or not the object in the target object area is a smoky object, based on the image feature amount in the target object area.

2. The image processing apparatus according to claim 1, wherein
    the recognition processing controller is configured to extract feature amount extracting unit extracts a spatial integral value of at least brightness as the image feature amount.

* * * * *